(12) United States Patent
Borras et al.

(10) Patent No.: US 10,716,339 B1
(45) Date of Patent: Jul. 21, 2020

(54) MOBILE TEXTILE CHARGER AND GARMENT USING SAME

(71) Applicants: Jaime Andreas Borras, Miramar, FL (US); Mauricio Bendeck, Miami, FL (US)

(72) Inventors: Jaime Andreas Borras, Miramar, FL (US); Mauricio Bendeck, Miami, FL (US)

( * ) Notice: Subject to any disclaimer, the term of this patent is extended or adjusted under 35 U.S.C. 154(b) by 0 days.

(21) Appl. No.: 15/968,696

(22) Filed: May 1, 2018

Related U.S. Application Data

(60) Provisional application No. 62/492,421, filed on May 1, 2017.

(51) Int. Cl.
| | |
|---|---|
| *A41D 1/00* | (2018.01) |
| *H02N 1/04* | (2006.01) |
| *H02S 20/30* | (2014.01) |
| *H02J 7/35* | (2006.01) |
| *H02J 7/04* | (2006.01) |

(52) U.S. Cl.
CPC ............ *A41D 1/005* (2013.01); *H02J 7/35* (2013.01); *H02N 1/04* (2013.01); *H02S 20/30* (2014.12); *H02J 7/04* (2013.01); *H02J 2207/40* (2020.01)

(58) Field of Classification Search
CPC . H02J 7/35; H02J 7/355; Y02E 60/12; H01M 10/465; H01M 16/006
See application file for complete search history.

(56) References Cited

U.S. PATENT DOCUMENTS

| | | | |
|---|---|---|---|
| 2002/0089304 A1* | 7/2002 | Lew | G01S 19/18 320/107 |
| 2005/0140331 A1* | 6/2005 | McQuade | A45C 15/00 320/101 |
| 2008/0210728 A1* | 9/2008 | Bihn | A45F 3/04 224/576 |
| 2017/0099015 A1* | 4/2017 | Shi | H02M 1/32 |
| 2017/0271922 A1* | 9/2017 | Kim | H02J 50/12 |

* cited by examiner

*Primary Examiner* — Arun C Williams
(74) *Attorney, Agent, or Firm* — Scott M Garrett

(57) ABSTRACT

An e-garment that includes embedded circuitry and a battery for power the embedded circuitry further includes several charge generator circuits that can include both active and passive charge generators, such as solar cells, triboelectric generator, piezoelectric generator, and thermoelectric generator circuits. Each different generator circuit accumulates charge in a respective storage capacitor until the voltage of the respective capacitor is sufficiently higher than that of the battery to overcome the forward voltage bias of a protective diode, where some of the charge flows out of the capacitor to the battery. Each of the charger generator circuits can contribute charge to the battery to prolong its operating time needed between recharges, if not actually recharge the battery.

19 Claims, 4 Drawing Sheets

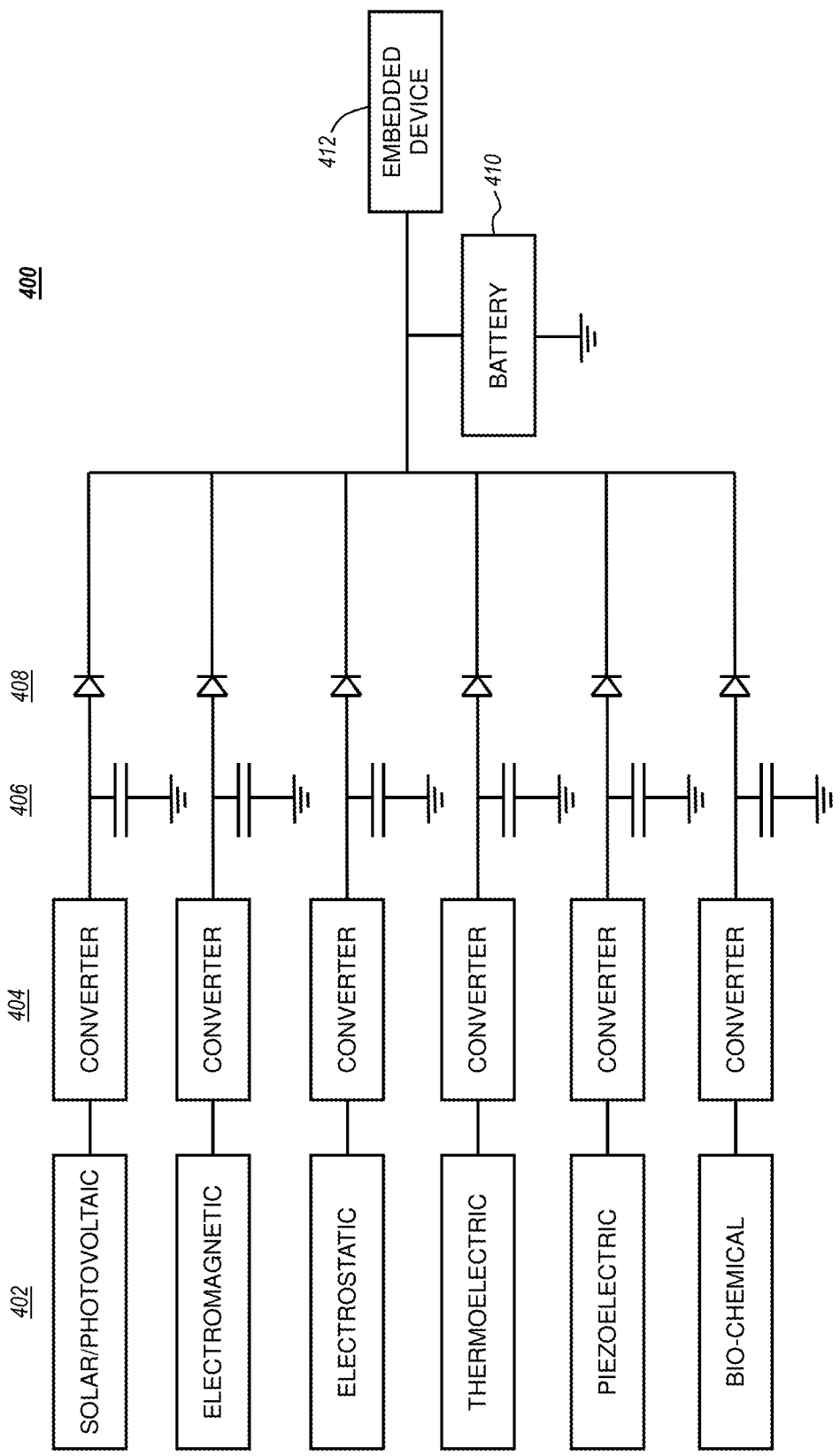

MOBILE TEXTILE CHARGER AND GARMENT USING SAME

CROSS REFERENCE

This application is a non-provisional application claiming priority to U.S. provisional application No. 62/492,421, filed, May 1, 2017, and titled "Mobile (In-Use) Textile Charger," which is hereby incorporated by reference in its entirety.

FIELD OF THE DISCLOSURE

The present disclosure relates generally to battery charging systems, and more particular to rechargeable battery systems disposed in garments.

BACKGROUND

E-garments, sometimes referred to as "smart" textiles, that enable electronic circuitry such as computers, sensors, transceivers and so on. These circuits and devices require power to operate, and therefore a battery (rechargeable) is provided in the garment to power the circuitry and devices. However, it is desirable to minimize the size of the battery as these component tend to be bulky and weighty. Opposing this design goal, however, is the is the goal to maximize operating time between battery recharge cycles, which tends to encourage using larger, bulkier batteries.

Accordingly, there is a need for a way to increase the operating time of a battery used for powering circuitry in an e-garment that does not unduly add to the bulk of the e-garment.

BRIEF DESCRIPTION OF THE FIGURES

In the accompanying figures like reference numerals refer to identical or functionally similar elements throughout the separate views, together with the detailed description below, and are incorporated in and form part of the specification to further illustrate embodiments of concepts that include the claimed invention and explain various principles and advantages of those embodiments.

FIG. 4 shows a block schematic diagram for a system including multiple diverse charge generation circuits to cooperatively contribute charge for providing power in an e-garment, in accordance with some embodiments.

Figure 1:
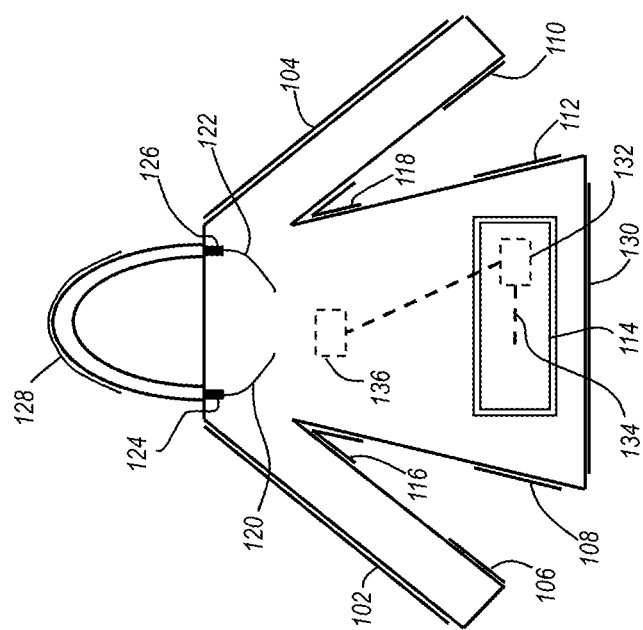
FIG. 1 shows an e-garment including multiple cooperative charging sources for providing charge to a battery, in accordance with some embodiments.

Those skilled in the field of the present disclosure will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein. The details of well-known elements, structure, or processes that would be necessary to practice the embodiments, and that would be well known to those of skill in the art, are not necessarily shown and should be assumed to be present unless otherwise indicated.

DETAILED DESCRIPTION

Embodiments of the disclosure provide an e-garment that includes a rechargeable battery, a charge aggregator circuit coupled to the rechargeable battery that provides charge to the rechargeable battery to recharge the rechargeable battery, and a plurality of charge generation circuits including at least two different kinds of charge generation circuits. The different kinds of charge generation include energy capture circuit components that generate electrical charge from mechanical, thermal, or radiant energy sources and wherein the energy capture components are disposed on the e-garment.

In a further embodiment, the energy capture circuit components can include a light to electrical conversion cell, such as a solar cell.

In a further embodiment, the energy capture circuit components can include a triboelectric cell.

In a further embodiment, the energy capture circuit components can include a generator circuit including a drawstring having a permanent magnet disposed therein, and two ends, where each end is exposed outside of the e-garment. The generator circuit can further include a coil through which the drawstring is laced that is disposed in the e-garment, and a rectifier converter circuit coupled to the coil and which provides a DC voltage to the charge aggregator circuit when the permanent magnet within the drawstring is cycled back and forth through the coil.

In a further embodiment, the drawstring is a hood drawstring that is further laced around the perimeter of a hood opening of a hood of the e-garment.

In a further embodiment, the energy capture circuit components can include an electrostatic triboelectric generator comprised of first and second electrodes configured to be in frictional contact with each other. The first and second electrodes are made of different materials that generate charge upon being slid across each other.

In a further embodiment, a first triboelectric electrode is disposed on a sleeve portion of the e-garment and a second triboelectric electrode is disposed on a lower side of the e-garment.

In a further embodiment, the energy capture circuit components can include a thermoelectric converter.

In a further embodiment, the thermoelectric converter is disposed in an armpit region of the e-garment.

In a further embodiment, the charge aggregator circuit can include a plurality of inputs, each input coupled to a separate one of the charge generation circuits, each input coupled to a charge storage component and having a blocking diode coupled in series between a positive terminal of the charge storage component and the positive terminal of the embedded battery.

FIG. 1 shows an e-garment 100 including multiple cooperative charging sources for providing charge to a battery, in accordance with some embodiments. An e-garment is a garment that has electronic devices, such as sensors, transmitters, and/or other circuitry, and a power source for power circuitry. The circuitry can be distributed in different portions of the garment and wired together. There are numerous applications for e-garments, such as health monitoring, occupational applications, safety application, to name a few. The electronics to enable these applications will require a power source, and one that fits within the design constraints of a garment without adding undesirable bulk or weight. Those design constraints, as will all mobile application, make small batteries desirable, but size is always proportional to capacity. Thus, the desire to reduce size and increase capacity are in contention with each other. Embodiments of the disclosure herein alleviate that contention by combining several sources of charge to supplement the electric power provided by the battery to effectively increase its capacity, if not to actually recharge the battery.

Accordingly, the e-garment 100 is provided with several means of generating electric charge, including, for example, flexible solar cell panels 102, 104 which can be disposed on the sleeves of the e-garment (which, shown here, is in the form of a hooded sweater shirt, or "hoodie"). The flexible solar panels 102, 104 can be arranged as stripes down the sleeves of the e-garment, and can be fabricated with monocrystalline semiconductor material that uses graphene electrodes. The output of the solar cells 102, 104 can be provided to a charge aggregator in circuitry 132 in the e-garment 100. In some embodiments additional panels can be provided on other part of the garment, such as on the top of the hood where a panel 128 can best receive light.

Another source of charge can be generated by a triboelectric effect between different materials that are frictionally engaged. For example, portion 106, 110 of a first material can be disposed on the inner cuffs of the sleeves, and portions 108, 112 of a second material can be disposed on the sides of the garment 100. When one of the first portions 106, 110 is rubbed against one of the second portions 108, 112, a charge is generated which can be conducted to the charge aggregator circuit 132 via conductors. The dissimilar materials of portion 106, 108 and 110, 112 are arranged so that when the wearer of the garment 100 is walking, the first portions 106, 110 can occasionally rub against the corresponding second portions 108, 112 to generate charge. Another portion 114 of the second material can be disposed inside a front pocket, and when the wearer puts their hands into the pocket, such as to keep their hands warms, friction between the materials can generate charge. The materials can be, for example, rubber and plastic, wool, silk, and other materials known to create charge when rubbed together. The charge can be collected via conductors disposed in the portions 108, 018, 110, 112, 114 and routed through the charge aggregator circuitry 132.

A third example of charge generation can be the use of thermoelectric effect, known as the Seebeck effect for thermoelectric generation. In a thermoelectric generator, a charge differential is created when two different materials of a thermoelectric cell have different temperatures. Accordingly, in some embodiments, thermoelectric generators 116, 118 can be disposed on the garment 100 in locations that are warmest in the interior of the garment, but which can be exposed to the outside, such in the armpit regions of the garment 100. Each thermoelectric generator 116, 118 can be arranged with one material facing towards the interior of the garment 100, and one material facing outwards. Each of the thermoelectric generators 116, 118 are likewise wired to provide charge to the charge aggregator circuitry 132.

A fourth example of a charge generation is a simple electromechanical generator formed in the laces of the hood. On each side of the hood, an electrical inductance elements 124, 126 can be disposed through which lace ends 120, 122 are threaded. The lace can include permanent magnet elements that are moved back and forth through the inductance elements 124, 126 to generate a voltage across the terminals of the electrical inductance elements 124, 126. The output terminals of each of the inductance elements 124, 126 can be connected to the charge aggregator circuitry 132 to collect charge from these elements. In use, the wearer would intentionally move the lace ends back and forth through the inductance elements to generate charge. In that regard this form of charge generation require active manipulation by the wearer, and can be done, for example, while the wearer is otherwise idle, such as when being transported as a passenger in a vehicle, or at other times when the wearer does not need to use their hands for other things.

A fifth example of charge generation is the use of a piezoelectric element 130, which can be located at a bottom of the garment 100, or at other locations that are likely to experience pressure (e.g. when the wearer sits and pressure due to the weight of the wearer against the seat occurs). The piezoelectric effect is well known, and piezoelectric materials create a voltage when under pressure or pressure differential. Accordingly, piezoelectric element 130 can be wired to charge aggregator circuitry 132 to accumulate charge created by piezoelectric element 130.

The charge aggregator circuitry 132 receives differing amounts of charge from the various charge generation sources. Some are more effective than other under different conditions. For example, solar cells/panels 102, 104, 128 will not generate charge under dark conditions, but may produce a majority of the charge collected under bright light conditions. The charge can be directed to a rechargeable battery associated with the charge aggregator circuitry that is disposed in the garment 100, which can be used to power electronic disposed in the garment, such as a wireless sensor 136. The wireless sensor 136 can be, for example, a temperature sensor that communicates temperature information wirelessly to a nearby device, such as a cellular phone device, over a short range wireless networking link, such as those described by the Institute of Electrical and Electronic Engineers (IEEE) in their specifications 802.11 and 802.15, some of which are commonly known as WiFi, BlueTooth, and Zigbee. Furthermore, a connector 134 can be provided to provide charge to an external device, such as a cellular phone device. The charge provided by the charge aggregator circuitry 132 may not be enough to recharge the battery of the external device, but it can extend its operating time under most conditions.

Figure 2:
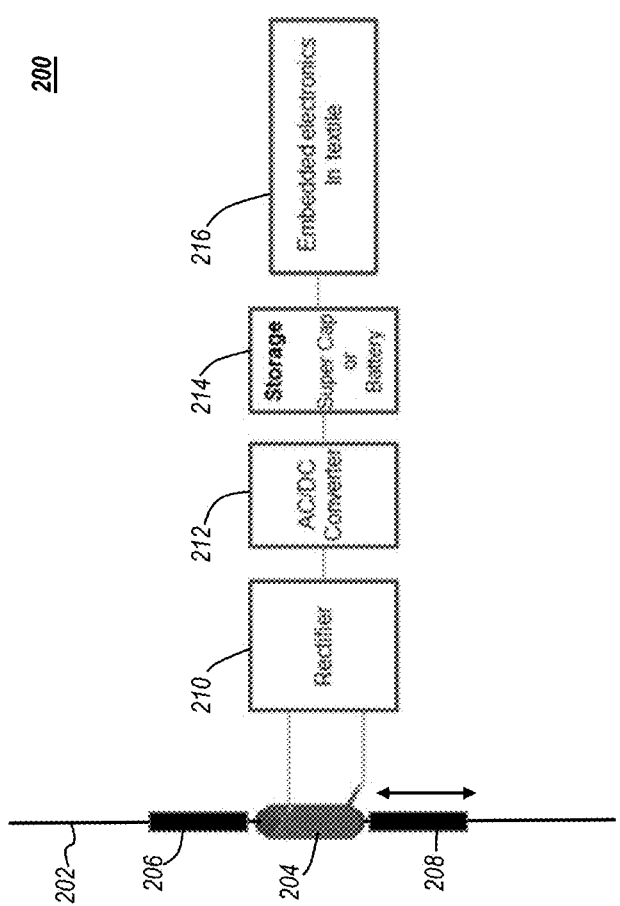
FIG. 2 show a block schematic circuit diagram for an exemplary electromechanical charge generation circuit for an e-garment, in accordance with some embodiments.

FIG. 2 show a block schematic circuit diagram for an exemplary electromechanical charge generation circuit 200 for an e-garment, in accordance with some embodiments. The electromechanical charge generation circuit 200 can be substantially similar to that of FIG. 1 represented by the laces 120, 122, and inductance elements 124, 126. A lace 202 passes through an inductance element 204 and is moveable back and forth through the inductance element 204. On the lace 202 can be one or more permanent magnet elements 206, 208, which, when moved through the inductance element 204 induce a voltage across the terminals of the inductance element 204, which are connected to a rectifier circuit 210 and AC/DC converter circuit 212 that ensure the polarity of the charge is shifted when necessary to produce a DC voltage into a battery 214 or other storage device (e.g. super capacitor). The charge stored in the battery 214 can be used by other circuitry 216, including circuitry embedded or contained in the garment, as well as external devices.

Figure 3:
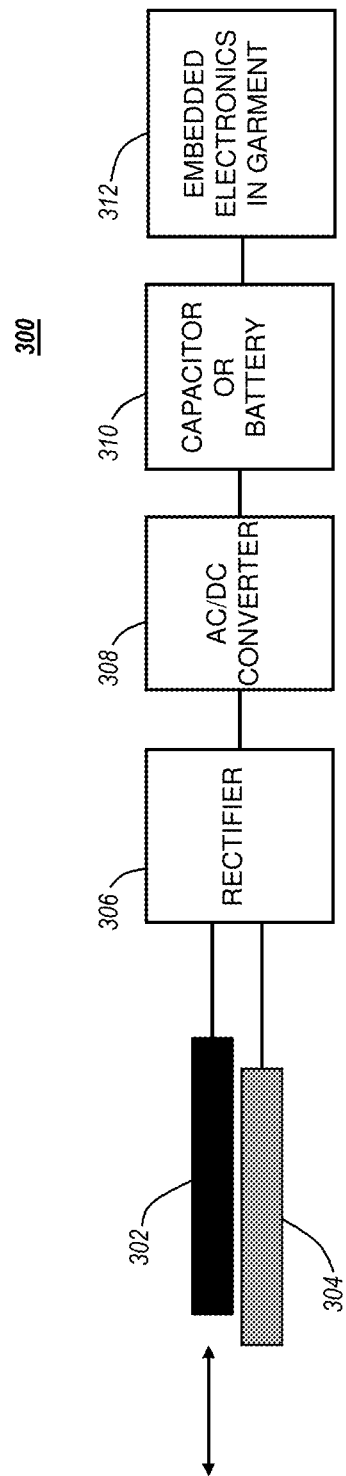
FIG. 3 shows a block schematic diagram for an exemplary triboelectric charge generation circuit for an e-garment, in accordance with some embodiments.

FIG. 3 shows a block schematic diagram for an exemplary triboelectric charge generation circuit 300 for an e-garment, in accordance with some embodiments. A portion of a first material 302 and a portion of a second material 304 are disposed on the garment in locations where they can be frictionally engaged with each other (e.g. rubbed together), such as portions 106, 108 of FIG. 1. The two materials are materials that produce a triboelectric effect when rubbed together, and each portion of material 302, 304, are separately connected to a rectifier circuit 306 and AC to DC converter 308 that directs charge, regardless of the polarity of the resulting voltage, into a storage device 310 such as a battery or capacitor. The charge accumulated can then be used to power circuitry 312 such as circuitry that is embedded in the garment or external devices. As with circuit components 210, 212, 214, the rectifier 306, converter 308, and storage 310 are all embedded in a garment.

FIG. 4 shows a block schematic diagram for a system 400 including multiple diverse charge generation circuits to cooperatively contribute charge for providing power in an e-garment, in accordance with some embodiments. The system 400 is a charge aggregator circuit that collects charge produced from various sources 402 in the garment. The sources can include, for example, solar/photovoltaic generations sources, electromagnetic sources (e.g. FIG. 2), electrostatic sources (e.g. FIG. 3), thermoelectric sources, piezoelectric sources, and bio-chemical sources. Each of the sources 402 includes a generator/generation circuit that is connected to a corresponding dedicated voltage converter circuit 404 that rectifies polarity of voltage produced by its corresponding source 402. The output of each converter is a storage device 406, such as a capacitor or battery cell. Each of the storage devices 406 are further connected to a dedicated diode 408. The diodes 408 only allow charge out of the storage device when the storage device has a voltage high enough to forward bias the corresponding diode 408. Each of the diodes 408 are collectively connected to a battery 410. Then, when the voltage of any storage device 406 is sufficiently higher than the voltage of the battery 410 to forward bias the diode 408, then charge will flow from the respective storage device 406 to the battery 410 and/or device circuitry 412. The device circuitry 412 can be embedded circuitry in the garment such as a sensor, lighting, transceiver, and so on. The device circuitry 412 can further include connectors or connections to provide power to an external device, such as a micro-USB cable that can connect to a cellular phone device to provide charge to the external device.

Accordingly, the embodiments of the disclosure provide the benefit of generating charge from several independent sources including both passive and active sources, to provide power to circuitry in an e-garment. The charge generation can allow the circuitry to work longer based on a given battery, thereby allowing the use of a smaller capacity battery that is required to be incorporated in the e-garment.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description as part of the original disclosure, and remain so even if cancelled from the claims during prosecution of the application, with each claim standing on its own as a separately claimed subject matter. Furthermore, subject matter not shown should not be assumed to be necessarily present, and that in some instances it may become necessary to define the claims by use of negative limitations, which are supported herein by merely not showing the subject matter disclaimed in such negative limitations.

We claim:

1. An e-garment, comprising:
a rechargeable battery;
a charge aggregator circuit coupled to the rechargeable battery that provides charge to the rechargeble battery to recharge the rechargeable battery; and
a plurality of charge generation circuits including at least two different kinds of charge generation circuits, wherein the different kinds of charge generation include energy capture circuit components that generate electrical charge from mechanical, thermal, or radiant energy sources and wherein the energy capture components are disposed on the e-garment;
wherein the charge aggregator circuit comprises a plurality of inputs, each input coupled to a separate one of the charge generation circuits, each input coupled to a charge storage component and having a blocking diode coupled in series between a positive terminal of the charge storage component and the positive terminal of the embedded battery.

2. The e-garment of claim 1, wherein the energy capture circuit components includes a light to electrical conversion cell.

3. The e-garment of claim 1, wherein the energy capture circuit components includes a triboelectric cell.

4. The e-garment of claim 1, wherein the energy capture circuit components includes a generator circuit comprising:
a drawstring having a permanent magnet disposed therein and two ends, where each end is exposed outside of the e-garment;
a coil through which the drawstring is laced that is disposed in the e-garment;
a rectifier converter circuit coupled to the coil and which provides a DC voltage to the charge aggregator circuit when the permanent magnet within the drawstring is cycled back and forth through the coil.

5. The e-garment of claim 4, wherein the drawstring is a hood drawstring that is further laced around the perimeter of a hood opening of a hood of the e-garment.

6. The e-garment of claim 1, wherein the energy capture circuit components include an electrostatic triboelectric generator comprised of first and second electrodes configured to be in frictional contact with each other, wherein the first and second electrodes are made of different materials that generate charge upon being slid across each other.

7. The e-garment of claim 6, wherein a first electrode is disposed on a sleeve portion of the e-garment and a second electrode is disposed on a lower side of the e-garment.

8. The e-garment of claim 1, wherein the energy capture circuit components include a thermos-electric converter.

9. The e-garment of claim 8, wherein the thermos-electric converter is disposed in an armpit region of the e-garment.

10. An e-garment, comprising:
a rechargeable battery;
a charge aggregator circuit coupled to the rechargeable battery that provides charge to the rechargeable battery to recharge the rechargeable battery;
a plurality of charge generation circuits including at least two different kinds of charge generation circuits, wherein the different kinds of charge generation include energy capture circuit components that generate electrical charge from mechanical, thermal, or radiant energy sources and wherein the energy capture components are disposed on thee-garment; and
wherein one of the energy capture circuit components includes a generator circuit including:
a drawstring having a permanent magnet disposed therein and two ends, where each end is exposed outside of the e-garment;
a coil through which the drawstring is laced that is disposed in the e-garment;
a rectifier converter circuit coupled to the coil and which provides a DC voltage to the charge aggregator circuit when the permanent magnet within the drawstring is cycled back and forth through the coil.

11. The e-garment of claim 10, wherein the drawstring is a hood drawstring that is further laced around the perimeter of a hood opening of a hood of the e-garment.

12. The e-garment of claim 10, wherein the energy capture circuit components further includes a light to electrical conversion cell.

13. The e-garment of claim 10, wherein the energy capture circuit components further includes a triboelectric cell.

14. The e-garment of claim 10, wherein the charge aggregator circuit comprises a plurality of inputs, each input coupled to a separate one of the charge generation circuits, each input coupled to a charge storage component and having a blocking diode coupled in series between a positive terminal of the charge storage component and the positive terminal of the embedded battery.

15. An e-garment, comprising:
a rechargeable battery;
a charge aggregator circuit coupled to the rechargeable battery that provides charge to the rechargeable battery to recharge the rechargeable battery;
a plurality of charge generation circuits including at least two different kinds of charge generation circuits, wherein the different kinds of charge generation include energy capture circuit components that generate electrical charge from mechanical, thermal, or radiant energy sources and wherein the energy capture components are disposed on thee-garment; and
wherein one of the energy capture circuit components includes a generator circuit including:
an electrostatic triboelectric generator comprised of first and second electrodes configured to be in frictional contact with each other, wherein the first and second electrodes are made of different materials that generate charge upon being slid across each other, wherein a first electrode is disposed on a sleeve portion of the e-garment and a second electrode is disposed on a lower side of the e-garment.

16. The e-garment of claim 15, wherein the charge aggregator circuit comprises a plurality of inputs, each input coupled to a separate one of the charge generation circuits, each input coupled to a charge storage component and having a blocking diode coupled in series between a positive terminal of the charge storage component and the positive terminal of the embedded battery.

17. The e-garment of claim 15, wherein the energy capture circuit components further includes a light to electrical conversion cell.

18. The e-garment of claim 15, wherein the energy capture circuit components further includes a generator circuit comprising:
- a drawstring having a permanent magnet disposed therein and two ends, where each end is exposed outside of the e-garment;
- a coil through which the drawstring is laced that is disposed in the e-garment;
- a rectifier converter circuit coupled to the coil and which provides a DC voltage to the charge aggregator circuit when the permanent magnet within the drawstring is cycled back and forth through the coil.

19. The e-garment of claim 18, wherein the drawstring is a hood drawstring that is further laced around the perimeter of a hood opening of a hood of the e-garment.

\* \* \* \* \*